(12) United States Patent
Xu et al.

(10) Patent No.: US 10,890,508 B2
(45) Date of Patent: Jan. 12, 2021

(54) LARGE-AMPLITUDE VERTIVAL-TORSIONAL COUPLED FREE VIBRATION DEVICE FOR WIND TUNNEL TEST

(71) Applicant: DALIAN UNIVERSITY OF TECHNOLOGY, Dalian (CN)

(72) Inventors: Fuyou Xu, Dalian (CN); Donglei Zeng, Dalian (CN); Jing Yang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 102 days.

(21) Appl. No.: 16/338,356

(22) PCT Filed: Aug. 28, 2017

(86) PCT No.: PCT/CN2017/099364
§ 371 (c)(1),
(2) Date: Mar. 29, 2019

(87) PCT Pub. No.: WO2019/019246
PCT Pub. Date: Jan. 31, 2019

(65) Prior Publication Data
US 2019/0219475 A1    Jul. 18, 2019

(30) Foreign Application Priority Data
Jul. 28, 2017 (CN) .......................... 2017 1 0629924

(51) Int. Cl.
*G01M 9/02* (2006.01)
*G01M 9/04* (2006.01)
(Continued)

(52) U.S. Cl.
CPC ............ *G01M 7/06* (2013.01); *G01M 5/0008* (2013.01); *G01M 5/0066* (2013.01); *G01M 7/00* (2013.01);
(Continued)

(58) Field of Classification Search
CPC .......... G01M 9/04; G01M 9/02; G01M 9/062; G01M 9/06; G01M 9/065; G01M 9/08;
(Continued)

(56) References Cited

U.S. PATENT DOCUMENTS

2012/0024071 A1* 2/2012 Herrig ................... G01M 9/065
73/717
2018/0045601 A1* 2/2018 Hartmann ......... G01M 17/0074

FOREIGN PATENT DOCUMENTS

CN    101419117 A    4/2009
CN    102175418 A    9/2011
(Continued)

*Primary Examiner* — Andre J Allen
(74) *Attorney, Agent, or Firm* — Muncy, Geissler, Olds & Lowe, P.C.

(57) ABSTRACT

The invention provides a large-amplitude vertical-torsional coupled free vibration device, which belongs to the technical field of vertical-torsional coupled free vibration device for wind tunnel test. The gear blocks are consolidated at both ends of the beam. The screws, beam, and the gear blocks are fixed on the model, and they can fulfil the vertical-torsional coupled free vibration. The toothed plate is attached to the sliding block that iteratively moving along the vertical guide rail which is fixed to the ground. The vertical springs attached to the sliding blocks provide both vertical and torsional linear stiffness for the suspension vibration system. The springs only have vertical linear tensile deformations without any lateral tilt, which ensures the linear vertical and torsional stiffness of the model, and the lateral freedom is effectively restrained. This device can achieve the large-amplitude vertical-torsional coupled free vibration of the model, and the deficiency of the traditional device where springs are apparently tilted and the inefficacy of linear stiffness can be avoided. The lateral vibration is restrained, and it is applicable to large-amplitude vertical-torsional coupled free vibrations.

2 Claims, 1 Drawing Sheet

(51) Int. Cl.
  *G01M 7/06* (2006.01)
  *G01M 7/00* (2006.01)
  *G01M 5/00* (2006.01)
  *G01M 9/06* (2006.01)

(52) U.S. Cl.
  CPC ............... *G01M 9/02* (2013.01); *G01M 9/04* (2013.01); *G01M 9/062* (2013.01)

(58) Field of Classification Search
  CPC ........... G01M 17/007; G01M 17/0074; G01M 9/067; G01M 10/00; G01M 15/14; G01M 17/0072; G01M 13/027; G01M 17/0076
  USPC .......................................................... 73/147
  See application file for complete search history.

(56) References Cited

FOREIGN PATENT DOCUMENTS

| | | |
|---|---|---|
| CN | 203929356 U | 11/2014 |
| JP | H09-210839 A | 8/1997 |
| JP | 2002-082014 A | 3/2002 |

\* cited by examiner

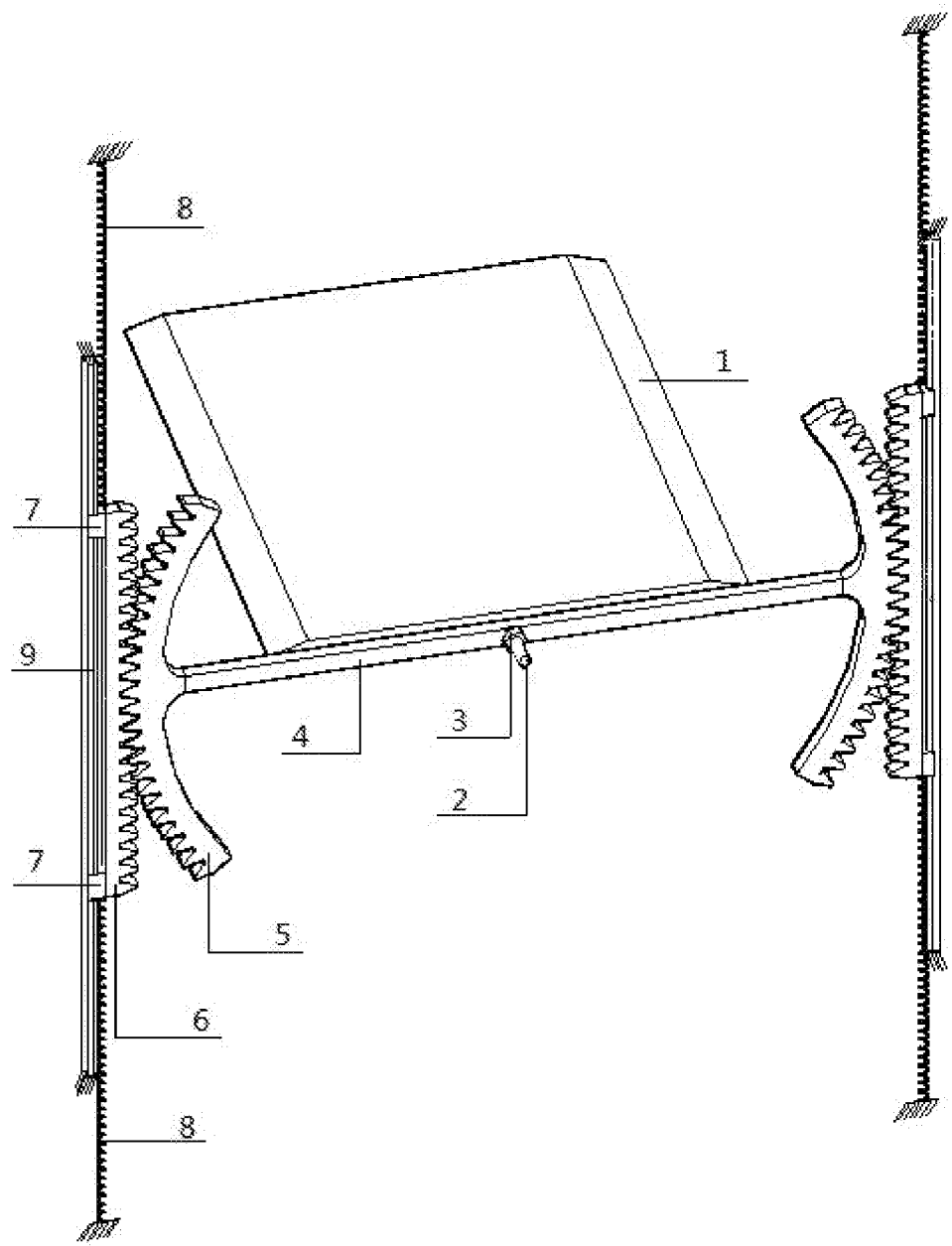

LARGE-AMPLITUDE VERTIVAL-TORSIONAL COUPLED FREE VIBRATION DEVICE FOR WIND TUNNEL TEST

TECHNICAL FIELD

The invention is a wind tunnel test device for vertical-torsional coupled free vibration which can assure linear stiffness of vertical and torsional modes and further realize large amplitudes. Based on the transmission from translational motion to rotation between toothed plate and gear block, the large-amplitude vertical-torsional coupled free vibration are transformed into the free tensile deformation of the linear vertical spring. The linear stiffness in both vertical and torsional freedom for the model can be ensured by the linear tensile stiffness of the vertically arranged springs.

BACKGROUND

The technique of vertical-torsional coupled free vibration is one main way for bridge vibration measurement and identification of flutter derivatives in wind tunnel tests. For the identification of flutter derivatives, the vertical-torsional coupled free vibration method can save much time, and it is unnecessary to ensure the same modal stiffness and frequency in the vibration. The traditional test device for coupled free vibration of deck sectional model is suspended by vertical springs, which is relatively simpler and can be easily realized. For vertical-torsional vibration with small amplitude, when the springs vertical tilts are minor, the springs mainly generate vertical deformation in the vibration, and the spring geometric stiffness is approximately linear. However, when torsional amplitude is bigger in coupled free vibration, the springs may obviously tilt, and the linear geometric stiffness of springs cannot be ensured. Therefore, the vertical and torsional stiffness of coupled free vibration system cannot remain constants, but related to the torsional amplitude, which causes simulation and measurement errors. The larger amplitude of vertical-torsional coupled free vibration, the larger spring tilt and the higher testing error. It is generally considered that the errors can be ignored when the torsional amplitude is lower than 3°. For the large-amplitude torsional free vibration, e.g., the torsional amplitude reached 35° when Tacoma Bridge was destroyed by wind, traditional test device for vertical-torsional coupled free vibration is definitely invalid.

SUMMARY

The invention solves the technical problem which meets in the wind tunnel test for bridges and other structures in the vertical-torsional coupled free vibration with large amplitude. A testing device to accommodate large-amplitude linear vertical-torsional coupled free vibration is proposed to effectively avoid various nonlinear factors in the test. The wind tunnel test device for vertical-torsional coupled free vibration with large amplitude includes model, screw, nut, beam, gear block, toothed plate, sliding block, spring and guide rail.

The technical scheme of the invention:

A large-amplitude vertical-torsional coupled free vibration device for wind tunnel test, is characterized in that the device includes model 1, screw 2, nut 3, beam 4, gear block 5, toothed plate 6, sliding block 7, spring 8, guide rail 9. A screw 2 is fixed on both ends of the model 1. The screw 2 threads through the beam 4 and fixed by the nut 3, which ensures that the model 1 torsion center is concentric with that of the screw 2 and the beam 4. Gear blocks 5 are fixed at both sides of the beam 4. On the top and bottom sides of the gear block 5, the vertical springs 8 are attached. The spring 8 is connected with the free sliding block 7, which is installed on guide rail 9. The toothed plate 6 that meshes with the gear block 5 is fixed on the sliding block 7. Model 1 vibrates synchronously with gear block 5 in both vertical and torsional directions, drives the toothed plate 6, sliding block 7 installed on the guide rail 9 moving up and down under the constraints of the spring 8. The stretching of springs 8 produces only vertical deformation without lateral tilt. For this device, during the large-amplitude vertical-torsional coupled free vibration of model 1, spring 8 produces only vertical tensile deformation, and the linear geometric stiffness requirement of spring 8 can be satisfied, and the linear torsional and vertical stiffness of suspension model system can be ensured.

The advantages of the invention: The large-amplitude vertical-torsional coupled free vibration is transformed into vertical motion. Springs keep linear geometric stiffness, and the stretching of spring produces only vertical deformation without lateral tilt. During the vibrations, the spring tensile stiffness and arm of force keep unchanged, and therefore, the system of the torsional and vertical stiffness and vibration frequency remain constants in the whole process of vibration. Consequently, the nonlinear geometry, nonlinear torsional and vertical stiffness induced by the tilt of springs in traditional free vibration method can be circumvented. In addition, the lateral vibration can also be efficiently restricted in the new device, and it is unnecessary to restrain the degree of lateral freedom by using the tensioned steel wire that adopted in traditional method.

DESCRIPTION OF THE DRAWINGS

The sole FIGURE is a structural diagram of vertical-torsional coupled free vibration device for wind tunnel test.

In the sole FIGURE, the components include 1. model; 2. screw; 3. nut; 4. beam; 5. gear block; 6. toothed plate; 7. sliding block; 8. spring; 9. guide rail.

DETAILED DESCRIPTION

Combining the technical scheme and attached drawings, the specific implementations of this invention are showed as follows:

As shown in the sole FIGURE, the large-amplitude vertical-torsional coupled free vibration device is composed of model 1, screw 2, nut 3, beam 4, gear block 5, toothed plate 6, sliding block 7, spring 8, guide rail 9. Model 1, screw 2, and beam 4 (beam 4 and gear block 5 are consolidated) are closely connected into a whole by the nut 3, while ensuring the concentric condition. During free vertical-torsional coupled free vibration with large amplitude, the toothed plate 6 is driven to do vertical motion by the gear block 5. Meanwhile, the sliding block 7 which consolidated with the toothed plate 6 will also do vertical motion along the guide rail 9. The linear stiffness spring on the sliding block produces vertical expansion deformation without lateral tilt. The system torsion and vertical stiffness are provided by the spring vertical linear stiffness. Therefore, in the large-amplitude vibrations, the new device can avoid the geometric nonlinear stiffness of spring, nonlinear torsional and vertical stiffness of system that happened in traditional testing device, and the lateral vibration can be effectively restrained.

The invention claimed is:

1. A large-amplitude vertical-torsional coupled free vibration device for wind tunnel test, including model and spring, wherein the device also includes, screw, nut, beam, gear block, toothed plate, sliding block, guide rail; a screw is fixed on both ends of the model; the screw threads through the beam and fixed by the nut, which ensures that the model torsion center is concentric with that of the screw and the beam; gear blocks are fixed at both sides of the beam; on both sides of the gear block, the vertical springs are attached; the spring is connected with free sliding block that can freely slide up and down along the guide rail; the toothed plate that meshes with the gear block is fixed on the sliding block; model vibrates synchronously with gear block in both vertical and torsional directions, drives the toothed plate, sliding block installed on the guide rail moving up and down under the constraints of the springs; the springs produce only vertical deformations without lateral tilts.

2. The large-amplitude vertical-torsional coupled free vibration device for wind tunnel test of claim 1, wherein the described gear block and toothed plate determine the arc length of gear block, the teeth pitch and the length of toothed plate according to the required torsional and vertical vibration amplitude, torsional and vertical translation stiffness of model.

\* \* \* \* \*